United States Patent
Zhao et al.

(10) Patent No.: US 10,785,183 B2
(45) Date of Patent: Sep. 22, 2020

(54) COMPOSING SOCIAL MEDIA MESSAGES REFERENCING MULTIPLE MESSAGES

(71) Applicant: Twitter, Inc., San Francisco, CA (US)

(72) Inventors: Mengqi Zhao, Oakland, CA (US); Marius-Andrei Danila, San Francisco, CA (US); Tianhai Hu, San Francisco, CA (US); Jan Castor, San Francisco, CA (US); Jonathan Reis, Oakland, CA (US)

(73) Assignee: Twitter, Inc., San Francisco, CA (US)

( * ) Notice: Subject to any disclaimer, the term of this patent is extended or adjusted under 35 U.S.C. 154(b) by 8 days.

(21) Appl. No.: 16/283,699

(22) Filed: Feb. 22, 2019

(65) Prior Publication Data
US 2020/0274844 A1    Aug. 27, 2020

(51) Int. Cl.
*H04L 12/58* (2006.01)
*G06Q 10/10* (2012.01)
*G06Q 50/00* (2012.01)

(52) U.S. Cl.
CPC .......... *H04L 51/32* (2013.01); *G06Q 10/10* (2013.01); *G06Q 50/01* (2013.01); *H04L 51/04* (2013.01); *H04L 51/16* (2013.01); *H04L 51/34* (2013.01)

(58) Field of Classification Search
CPC ......... H04L 51/32; H04L 51/04; H04L 51/34; H04L 51/16; G06Q 10/10; G06Q 50/01
See application file for complete search history.

(56) References Cited

U.S. PATENT DOCUMENTS

| | | | | |
|---|---|---|---|---|
| 8,332,477 | B1* | 12/2012 | Kaiserlian | H04L 51/16 |
| | | | | 709/206 |
| 8,938,506 | B2* | 1/2015 | Moody | G06Q 10/107 |
| | | | | 709/204 |
| 9,143,468 | B1* | 9/2015 | Cohen | H04L 51/32 |
| 9,712,470 | B2* | 7/2017 | Saito | H04L 51/16 |
| 10,380,117 | B2* | 8/2019 | Takeda | G06F 16/24 |
| 10,536,410 | B2* | 1/2020 | Lim | H04L 51/16 |

(Continued)

OTHER PUBLICATIONS

Symons et al, "How do you link tweets in a reply to another tweet?", Accessed Mar. 16, 2020, https://www.quora.com/How-do-you-link-tweets-in-a-reply-to-another-tweet.*

(Continued)

*Primary Examiner* — Ramy M Osman
(74) *Attorney, Agent, or Firm* — Fish & Richardson P.C.

(57) ABSTRACT

Methods, systems, and apparatus, including computer programs encoded on computer storage media, for providing content on a social messaging platform. One of the methods includes providing a plurality of messages of a social messaging platform to a user device, the plurality of messages being part of a conversation; receiving a request associated with one of the plurality of messages, the request including an indication to repost a collection of messages; providing a selection user interface, the selection user interface including the plurality of messages and a respective selection indicator for each message; receiving a user selection of two or more messages; responsive to the user selection, generating a message composition interface, the message composition interface including a representation of the selected messages; and in response to user input, posting the representation of the selected messages as part of a new message of the user on the platform.

18 Claims, 7 Drawing Sheets

(56) References Cited

U.S. PATENT DOCUMENTS

| | | | | |
|---|---|---|---|---|
| 10,547,580 | B2* | 1/2020 | Roth | H04L 51/22 |
| 2004/0218594 | A1* | 11/2004 | Wolfe | H04L 51/28 |
| | | | | 370/389 |
| 2010/0325112 | A1* | 12/2010 | Berger | H04L 51/32 |
| | | | | 707/740 |
| 2012/0284648 | A1* | 11/2012 | Marshall | G06Q 50/01 |
| | | | | 715/753 |
| 2012/0324507 | A1* | 12/2012 | Weber | H04N 21/4782 |
| | | | | 725/37 |
| 2015/0263995 | A1* | 9/2015 | Mahood | H04L 51/04 |
| | | | | 715/753 |

OTHER PUBLICATIONS

Dua et al, "How do I quote someone's tweet while replying to another tweet?", Accessed Mar. 16, 2020, https://www.quora.com/How-do-I-quote-someones-tweet-while-replying-to-another-tweet.*

Twitter Support, "How to thread your Tweets together:", Accessed on Mar. 16, 2020, https://twitter.com/twittersupport/status/442433903546994688?lang=en.*

Parker, Sarah, "Quick tip: Twitter Quote tweets vs retweets," Sep. 24, 2016, retrieved on Sep. 23, 2019, retrieved from URL <https://unionmetrics.com/blog/2016/09/twitter-quick-tip-quotes-vs-retweets/>, 6 pages.

Perez, Sarah, "Twitter Is Experimenting With a New Way to Retweet," Jun. 24, 2014, retrieved on Sep. 23, 2019, retrieved from URL <https://techcrunch.com/2014/06/24/twitter-is-experimenting-with-a-new-way-to-retweet/?_ga=2.160292925.1400230016.1563672045-826451176.1563672045>, 11 pages.

Shu, Catherine, "Twitter Officially Launches Its "Retweet With Comment" Feature," Apr. 6, 2015, retrieved on Sep. 23, 2019, retrieved from URL <https://techcrunch.com/2015/04/06/retweetception/>, 10 pages.

* cited by examiner

COMPOSING SOCIAL MEDIA MESSAGES REFERENCING MULTIPLE MESSAGES

BACKGROUND

This specification relates to social messaging platforms, and in particular, to composing and presenting messages on the social messaging platform.

Social messaging platforms and network-connected personal computing devices allow users to create and share content across multiple devices in real-time.

Sophisticated mobile computing devices such as smartphones and tablets make it easy and convenient for people, companies, and other entities to use social networking messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform without specific designation by the authoring user.

SUMMARY

This specification describes technologies for composing messages on a social messaging platform. These technologies generally involve selecting multiple messages to including in a single message composition as a quote. In particular, a user can provide an input to a message requesting to quote multiple messages from a message conversation. The user can then select multiple messages from a presented user interface. A representation of the messages is provided in a message composition interface. The user can then select to post the composed message including the quoted messages. Other users of the social messaging platform that receive the message can interact with the quoted messages.

In general, one innovative aspect of the subject matter described in this specification can be embodied in methods that include the actions of providing a plurality of messages of a social messaging platform to a user device associated with a particular user account of the social messaging platform, the plurality of messages being part of a conversation; receiving a request associated with one of the plurality of messages, the request including an indication to repost a collection of messages; providing a selection user interface, the selection user interface including the plurality of messages and a respective selection indicator for each message; receiving a user selection of two or more messages; responsive to the user selection, generating a message composition interface, the message composition interface including a representation of the selected messages; and in response to user input, posting the representation of the selected messages as part of a new message of the user on the social messaging platform.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method further includes: providing the new message in one or more message timelines of second users having a following relationship with the user; and in response to a selection by a particular second user of the representation of the selected messages in the new message, directing the second user to a message thread for the conversation from which the selected messages were selected and providing a visual indicator within the conversation of the selected messages. The method further includes: providing the new message in one or more message timelines of second users having a following relationship with the user; and in response to a selection by a particular second user of a particular message in the representation of the selected messages, providing the selected particular message to the user in the context of the conversation. The method further includes: providing the new message in one or more message timelines of second users having a following relationship with the user; receiving a user input of an engagement action with a particular message in the representation of the selected message; and updating corresponding engagement data for the particular message. The plurality of messages include reply messages authored by one or more accounts of the social messaging platform. Receiving the repost request comprises providing the user with a plurality of options including an option to compose a message including multiple selected messages. Posting the message includes associating the message with one or more message streams of accounts of the social messaging platform, and wherein retrieving the message in response to a request for a message stream includes: using an identifier of the message to retrieve the message content, wherein the message content includes identifiers for the two or more selected messages; and using the identifiers for the two or more selected messages to retrieve the two or more selected messages and render them in the message presented in the message stream on a user device.

The subject matter described in this specification can be implemented in particular embodiments so as to realize one or more of the following advantages. A user of a social messaging platform can generate messages that quote more than one messages selected from a conversation. This allows the user to provide commentary on multiple quoted messages at once rather than separately commenting on individual messages. This further allows for responses that provide greater context to interactions in a conversation. Additionally, in contrast to a screenshot providing an image of particular messages, the quote incorporates the underlying messages such that users can interact with them as a group or individually. The social messaging platform can present multiple messages as a quote in a more visually pleasing and effective manner as compared to a screenshot capture. Additionally, the quoted messages can be indexed and searched based on their use as a quotation as well as have separate engagement measures computed, which a typical screenshot does not allow. Additionally, the described techniques for presenting multiple quoted messages can use less user data to display as compared to a screenshot image. This can result in a faster loading user interface.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
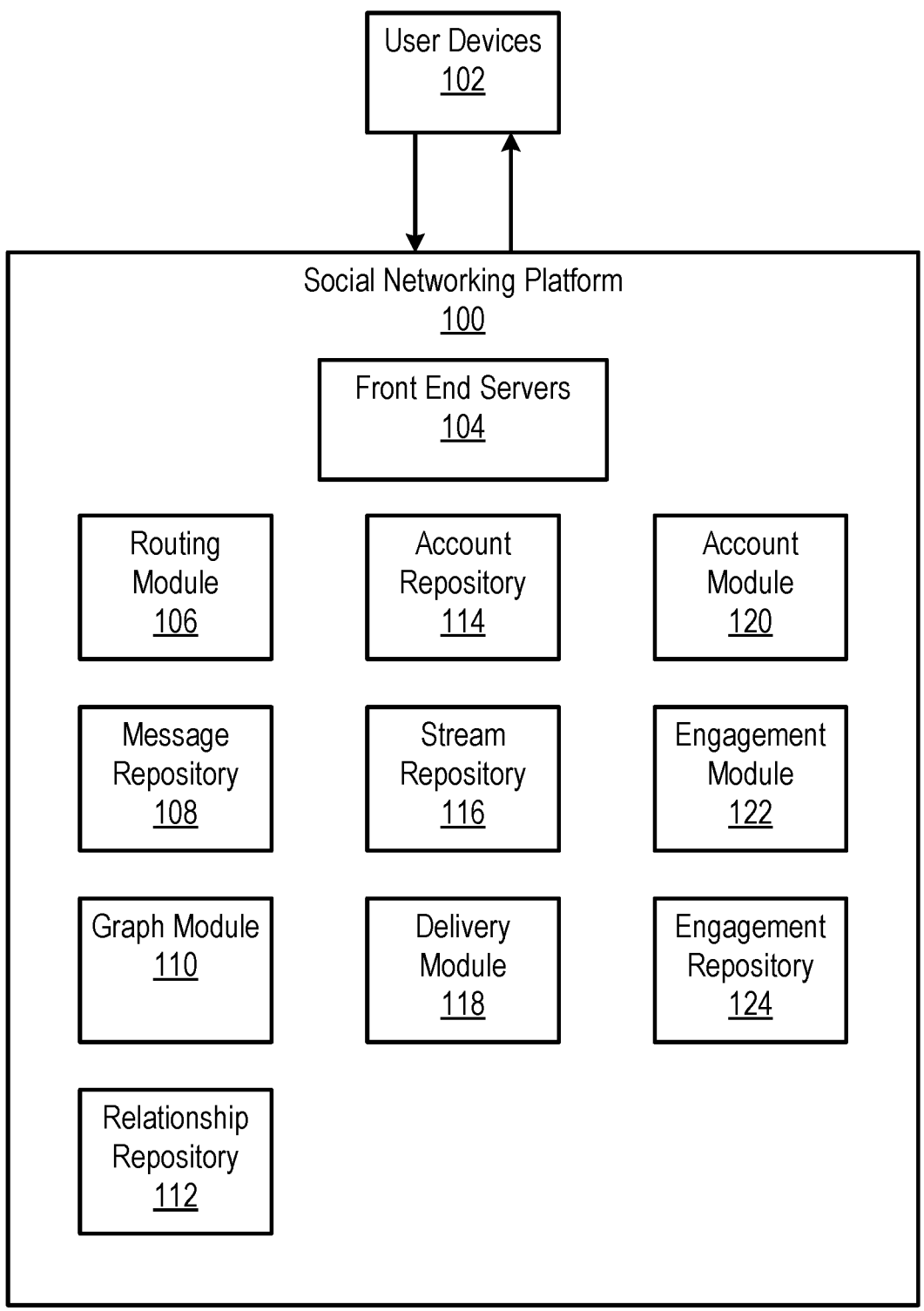
FIG. 1 illustrates an example online social messaging platform.

FIG. 1 illustrates an example online social messaging platform ("platform") 100 and example user devices 102 configured to interact with the platform over one or more data communication networks. The platform, the user devices, or both are configured, as will be described, to implement or perform one or more of the innovative technologies described in this specification.

Users can interact with the social messaging platform through their respective user devices 102. A user may be account holder of an account, or an authorized user of an account, on the platform. The platform 100 may have millions of accounts of individuals, businesses, or other entities, e.g., pseudonym accounts, novelty accounts, and so on.

Each user device 102 is configured with software, which will be referred to as a client or as client software, that in operation can access the platform 100 so that a user can publish messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, designed to work specifically with the platform. Or the client may be or include a Short Messaging Service (SMS) interface, an instant messaging interface, an e-mail-based interface, or an API function-based interface, for example.

The platform 100 is implemented on one or more computers in one or more locations that operate as one or more servers that support connections over a wired or wireless network from many different kinds of user devices. The platform 100 may have many millions of accounts, and anywhere from hundreds of thousands to millions of connections may be established or currently in use between clients and the platform at any given moment.

The platform 100 facilitates real-time communication between entities. The platform 100 provides facilities for users of accounts on the platform using clients on their user devices to use the platform to post messages to the platform and to use the platform to access messages posted by users of other accounts to the platform. In some implementations, the platform provides facilities for users to send messages directly to one or more other users of the platform, allowing the sender and recipients to maintain a private exchange of messages. The platform is configured to enable users to exchange messages in real-time, i.e., with a minimal delay. The platform is also configured to enable users to respond to messages sent earlier, on the order of hours or days or even longer. The platform is configured to display posted messages to one or more other users within a short time frame so as to facilitate what can essentially be a live conversation between the users. Accounts to which the platform displays a message may have a predefined relationship on the platform with an account of a user posting a message. For example, accounts to which the platform displays the message may be "followers" of the user account posting the message, meaning that the recipient has registered to receive messages authored by the followed account in a message stream of the recipient.

In some implementations, the platform is configured to include in a recipient's message stream content posted by, or engaged with by, accounts having a predefined connection relationship with the sending account. For example, the platform or an account preference may specify that a recipient account should generally or preferentially receive in an incoming message stream only messages from accounts followed by the recipient of the stream. In some implementations, the platform may be configured to include in a recipient's stream messages determined by the platform to be of possible interest to the recipient, e.g., advertisements, public service announcements, promoted content, or the like.

Thus, the basic messaging functionality of the platform includes at least publishing new messages, providing message streams on client request, managing accounts, managing connections between accounts, messages, and streams, and receiving engagement data from clients engaging with messages. The platform also indexes content items and access data and can provide the indexed data to account holders.

In some implementations of the platform, a message contains data representing content provided by the composer of the message. The message may be a container data type storing the content data. Types of data that may be stored in a message include text, graphics, video, computer code, e.g., uniform resource locators (URLs), for example. Messages can also include key phrases, e.g., hashtags, that can aid in categorizing or contextualizing messages. Messages can also include metadata that may or may not be editable by the composing account holder, depending on the implementation. Examples of message metadata include a time and date of authorship and a geographical location of the user device when it submitted the message. In some implementations, what metadata is provided to the platform by a client is determined by account holder controlled privacy settings.

Messages composed by one account holder may reference other accounts, other messages, or both. For example, a message may be composed in reply to another message composed by another account. A message may also be composed by a user in reply to a message originally broadcast or posted by the user. Messages may also be reposts of a message composed by and received from another account. Generally, an account referenced in a message may appear as visible content in the message, e.g., the name of the account, and may also appear as metadata in the message. As a result, the referenced accounts can be interactive in the platform. For example, users may interact with account names that appear in their message stream to navigate to the message streams of those accounts. The platform also allows messages to be private; a private message will only appear in the message streams of the composing and recipient accounts.

In some implementations, messages are microblog posts, which differ from e-mail messages, for example, in that an author of a microblog post does not necessarily need to specify, or even know, who the recipients of the message will be.

A stream is a stream of messages on the platform meeting one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

Accounts will in general have relationships with other accounts on the platform. Relationships between accounts of the platform are represented by connection data maintained by the platform, e.g., in the form of data representing one or more connection graphs. The connection data may be maintained in a connection repository. A connection graph includes nodes representing accounts of the platform and edges connecting the nodes according to the respective relationships between the entities represented by the nodes. A relationship may be any kind of association between accounts, e.g., a following, friending, subscribing, tracking, liking, tagging, or other relationship. The edges of the connection graph may be directed or undirected based on the type of relationship.

In some implementations, the platform tracks posted messages and engagement data representing engagement with the posted messages. In some implementations, the platform maintains, in a message repository, data that describes each posted message as well as the engagement data corresponding to each posted message.

Engagement data can include any type of information describing activity related to the posted message by an engaging account of the platform. Examples of engagement by a user include, for example, reposting the message, marking the posted message to indicate is a favorite of, liked by, or endorsed by the user, responding to the posted message, and mentioning or referencing the posted message. Engagement data may also include how many followers, connections, and/or friends of the context account have connections with the engaging account, e.g., are in a connection graph of the engaging account, or an indication that the context account is a favorite account of the engaging account.

The servers of the platform 100 perform a number of different services that are implemented by software installed and running on the servers. The services will be described as being performed by software modules. In some cases, particular servers may be dedicated to performing one or a few particular services and only have installed those components of the software modules needed for the particular services. Some, modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

In some implementations, the platform includes numerous different but functionally equivalent front end servers 104, which are dedicated to managing network connections with remote clients.

The front end servers 104 provide a variety of interfaces for interacting with different types of clients. For example, when a web browser accesses the platform, a web interface module in the front end module provides the client access. Similarly, when a client calls an API made available by the platform for such a purpose, an API interface provides the client access.

The front end servers 104 are configured to communicate with other servers of the platform, which carry out the bulk of the computational processing performed by the platform as a whole.

A routing module 106 stores newly composed messages in a message repository 108. The routing module 106 also stores an identifier for each message. The identifier is used to identify a message that is to be included in a stream. This allows the message to be stored only once and accessed for a variety of different streams without needing to store more than one copy of the message.

A graph module 110 manages connections between accounts. Connections determine which streams include messages from which accounts. In some implementations, the platform 100 uses unidirectional connections between accounts and streams to allow account holders to subscribe to the message streams of other accounts. A unidirectional connection does not necessarily imply any sort of reciprocal relationship. An account holder who establishes a unidirectional connection to receive another account's message stream may be referred to as a "follower," and the act of creating the unidirectional connection is referred to as "following" another account.

The graph module 110 receives client requests to create and delete unidirectional connections between accounts. In some implementations, these connections are stored in a relationship repository 112 as part of a unidirectional connection graph. Each connection in the relationship repository references an account in an account repository 114 or a stream in a stream repository 116.

In the same or a different embodiment, the graph module 110 can provide and manage bidirectional connections. In a bidirectional connection, both accounts are considered subscribed to each other's account message streams. The graph module 110 stores bidirectional connections in the relationship repository 112. In some implementations, the platform and relationship repository include both unidirectional and bidirectional connections.

A delivery module 118 constructs message streams and provides them to requesting clients, for example, through a front end server 104. Responding to a request for a stream, the delivery module 118 either constructs the stream in real time, or accesses from the stream repository 116 some or all of a stream that has already been generated. The delivery module 118 stores generated streams in the stream repository 116. An account holder may request any of their own streams, or the streams of any other account that they are permitted to access based on security settings. If a stream includes a large number of messages, the delivery module 118 generally identifies a subset of the messages to send to a requesting client. The remainder of the messages are maintained in the stream repository 116 and sent upon client request.

An account module 120 enables account holders to manage their platform accounts. The account module 120 allows an account holder to manage privacy and security settings, and their connections to other account holders.

Generally, the platform does not require the account holder to provide a large amount of personal information. This personal information can include, for example, an account name, which is not necessarily a real name, an identifier, a user name, a picture, a brief description of themselves or the entity, an e-mail address, and a website. The personal information does not necessarily include, and may purposefully exclude, real-world identifying information like age, gender, interests, history, occupation, and so on. Information about each account is stored in the account repository 114.

Client software allows account holders receiving a stream to engage, e.g., interact with, comment on, or repost, the messages in the stream. An engagement module 122 receives these engagements and stores them in an engagement repository 124. Types of engagement include selecting a message for more information regarding the message, selecting a URI (universal resource identifier) or hashtag in a message, reposting the message, or making a message a favorite. Any engagement stored in the engagement repository 124 may reference the messages, accounts, and/or stream involved in the engagement.

Figure 2:
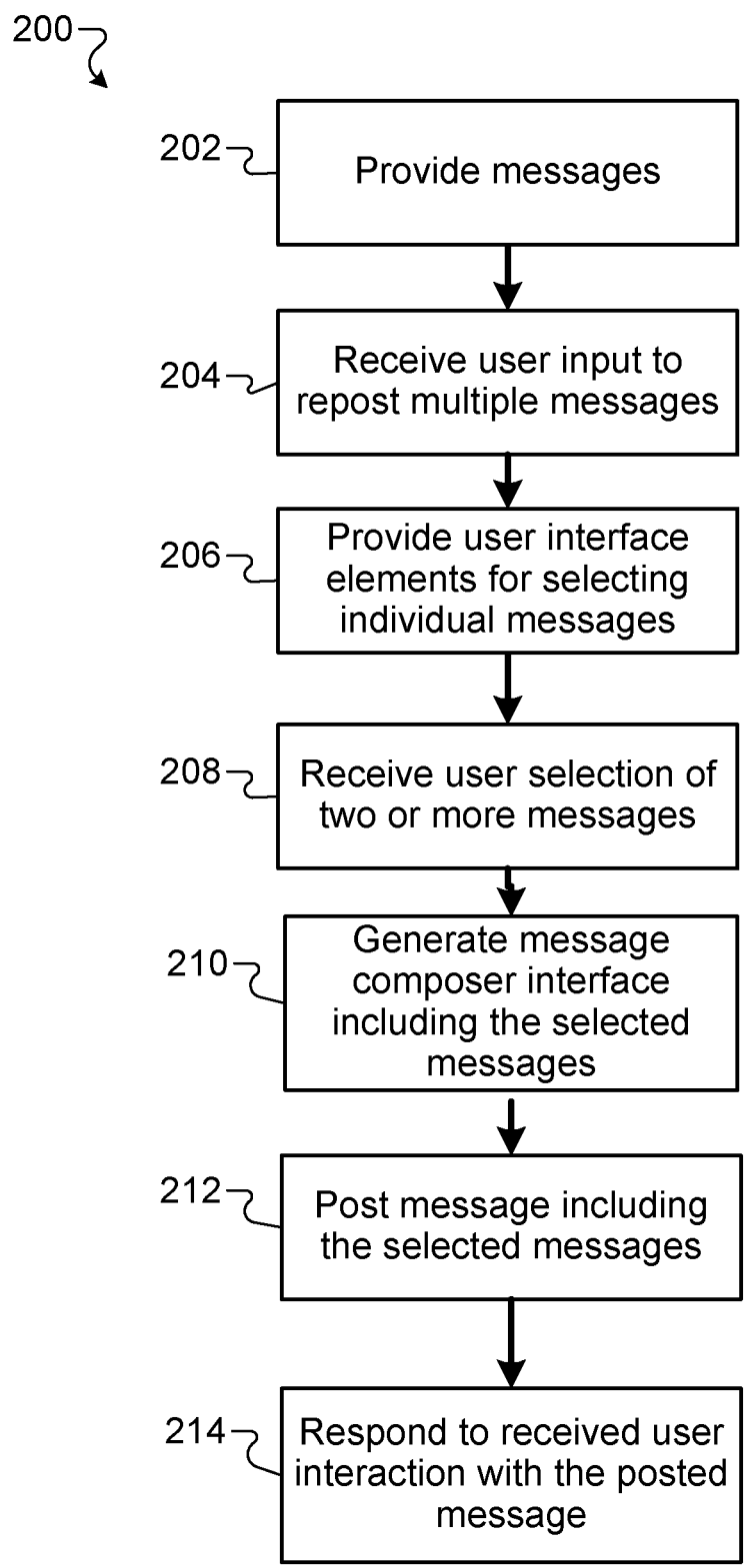
FIG. 2 is a flow diagram illustrating an example process for quoting multiple messages.

FIG. 2 is a flow diagram illustrating an example process 200 for quoting multiple messages. For convenience, the process 200 will be described with respect to a platform that performs the method, for example, the social networking platform 100.

The platform provides a collection of messages for presentation on a client device of the user (202). For example, a user can access the platform using account information, which results in a request to provide the user with a message stream generated for that user account. The message stream can include a number of messages authored by accounts followed by the user.

The user can engage with a particular message, for example, by selecting a message to expand a conversation associated with that message. The conversation can include replies to the original message as well as replies to other replies. Each message of the conversation can include user interface elements for different types of engagements with the message including replying, reposting, and endorsing the message.

The platform receives user input to repost multiple messages (204). For example, when selecting a particular repost element, the platform can provide for presentation of different reposting options. These options can include, for example, to repost the individual message, to compose a message that quotes the corresponding message in the body of the message, or an option to quote multiple messages in the body of a message.

Figure 3:
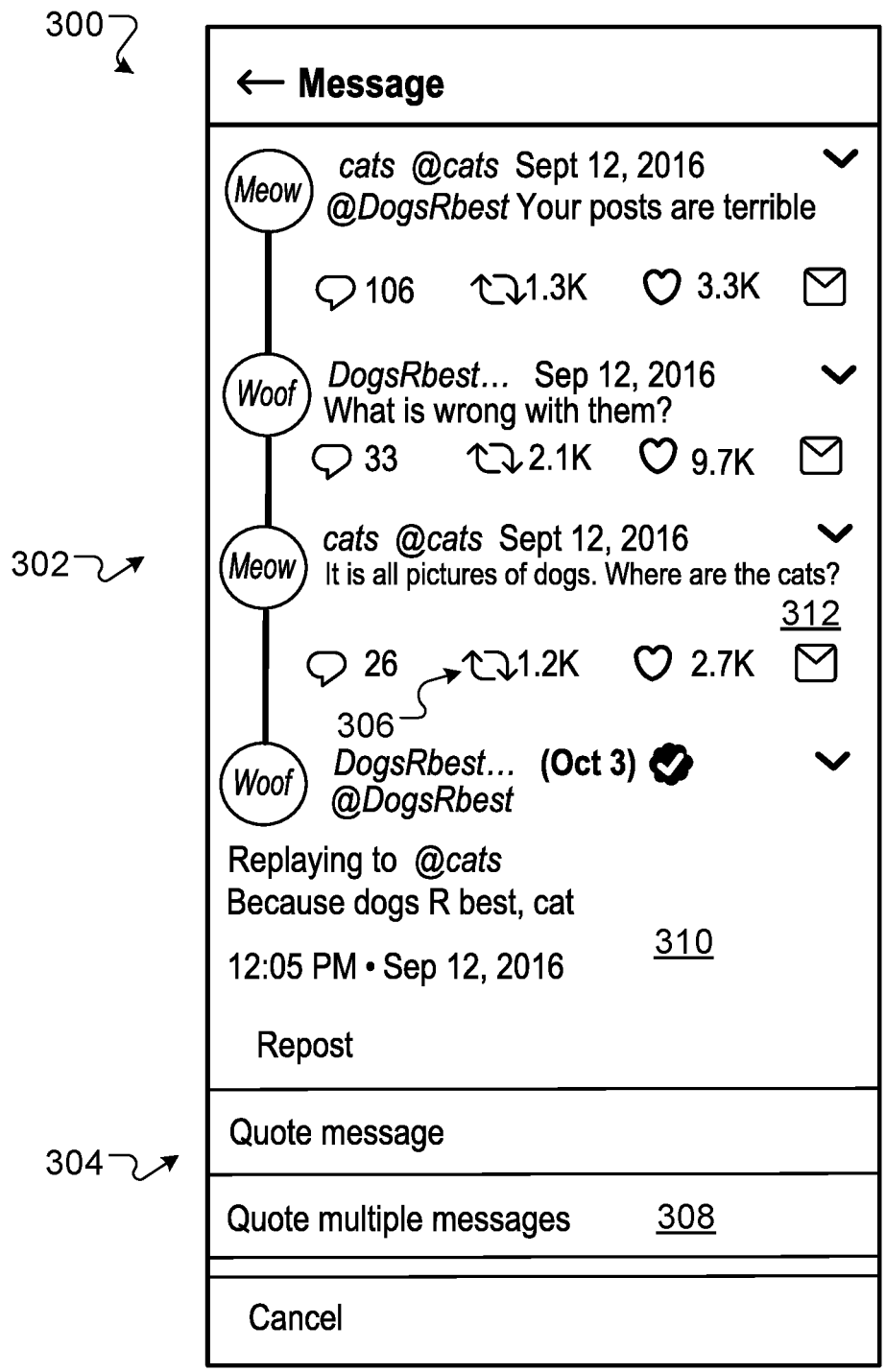
FIG. 3 is a screenshot illustrating an example user interface for composing a message quoting from multiple messages.

FIG. 3 is a screenshot illustrating an example user interface 300 for composing a message quoting from multiple messages. In particular, the user interface 300 includes a message portion 302 and repost options 304. The repost options 304 can be presented, for example, in response to the user selecting a repost user element 306 associated with one of the messages in the message portion 302. The presentation of the repost options 304, in this example, are highlighted such that the message portion 302 is darkened during presentation of the repost options 304. The repost options 304 includes options to repost including the option to quote multiple messages in the body of a message 308.

The message portion 302 includes multiple messages that are part of a conversation responding to an originating message. In particular, each message can be a reply to a previous message. For example, message 310 is a reply to message 312.

In response to the user selection to repost multiple messages a quote, the platform provides a user interface for selecting individual messages (206). For example, the messages of the conversation can be displayed along with a respective user interface element for selecting that message.

In response to the provided user interface, the platform receives a user selection of two or more messages (208). The user can individually select messages from the conversation to include, for example, by selecting three consecutive messages in the conversation. In some implementations, the user can select one or more messages, where the maximum number of messages can be limited based on various parameters. For example, the selection can be limited to the messages visible within the user interface, can be limited by a maximum number of messages, or can be limited by the message in the particular thread of the conversation.

Figure 4:
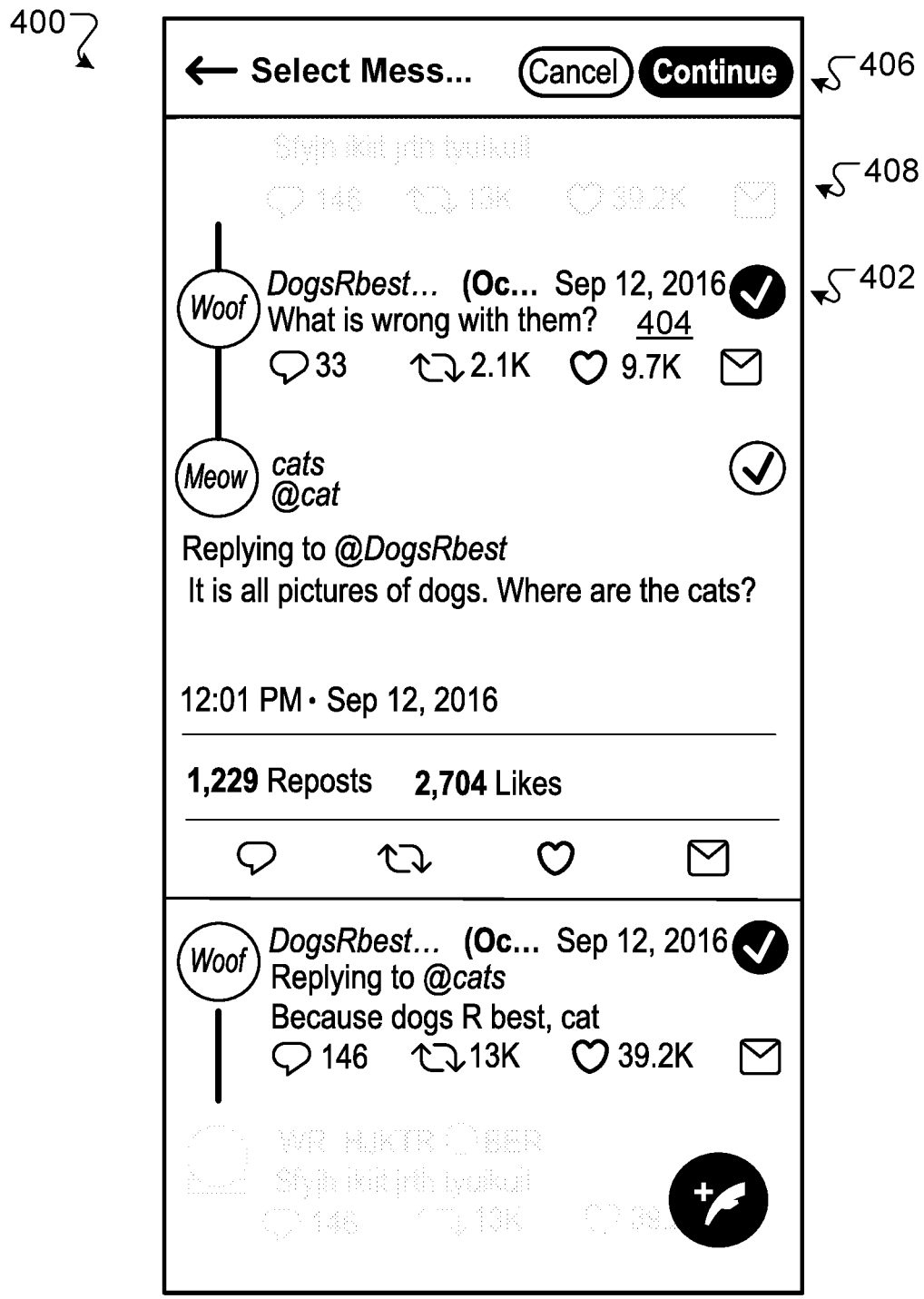
FIG. 4 is a screenshot illustrating an example user interface for selecting messages.

FIG. 4 is a screenshot illustrating an example user interface 400 for selecting messages. The user interface includes the messages of the conversation 401, each having a respective user interface element that a user can interact with to select a particular message of the conversation to include in the quote of multiple messages. In particular, message 404 includes user interface element 402 that indicates the message is to be included. Once the user has selected messages to include, a continue bottom 406 can be selected to move to a message composition interface including the selected messages.

In some implementations, some of the messages can be grayed out, blurred, or otherwise indicated as non-selected or non-selectable. For example, the user interface 400 includes additional messages 408 of the conversation that are non-selectable. This can be, for example, because the limit of selectable images has been reached, because they are part of different conversation threads, or for other suitable reasons.

The platform generates a message composition interface that includes a representation of the selected messages (210). The message composition interface includes the representation of the selected messages as well as allows the user to add additional text content to the message. Thus, the user can type, for example, a comment on the quoted messages in a similar manner to composing any message on the social messaging platform. This additional content and the quoted messages will all be part of a reposted message.

The representation of the selected messages can appear similar to a snapshot image of the conversation that encompasses the selected messages. The representation can illustrate how the quoted messages from the conversation will appear in a posted message. However, the representation may not be an actual image. Instead, this representation can formed from the underlying messages such that, when posted, users can interact with the individual underlying messages included in the quote.

In some implementations, the message, including one or more quoted messages, is stored as a data object having a particular data structure. The data structure can be populated with different information depending on the type and content of the message. For example, when applicable, the data structure for a given message can include references to messages that are replies to the message, accounts identified within the message, or a message identifier for reposted messages being quoted by the message.

The data structure for a message can further include information identifying one or more quoted messages added to the message composition by a user. For example, this information can include a message identifier for each message included in the quote. In some implementations, this includes an identification of an original message and one or more reply messages. Additionally, in some implementations when the quoted messages are part of a conversation, only the first reply and last reply message identifiers are needed to retrieve the full conversation of messages including intervening messages between the first and last reply.

In addition to the information identifying the quoted messages, the data structure can include an address pointer to the quoted messages, e.g., a URL or a shortened URL providing a permalink to the quoted messages. Alternatively, the pointers can be included with the respective identifiers. The address pointers or other identifiers can be used to redirect a user interface from the quoted message to the source conversation from which the message was taken. For example, in response to a user selection of a quoted message within a presented message including the quote, the messaging platform can provide a set of messages from which the quoted messages were originally obtained.

When providing a message including one or more quoted messages to a user for presentation, e.g., as part of a user timeline, the data structure information is used by the messaging platform to retrieve the individual messages of the quoted messages using the respective identifiers. Thus, the quoted messages are not an image of the messages, but are live messages retrieved by the messaging platform for display on a client interface with all of their current metadata including, e.g., engagement statistics for the quoted messages.

In some instances, it is possible that one or more underlying messages identified as quoted messages in a particular message data structure may not be available at some later point in time. For example, an underlying message may have been deleted or removed. As a result, one or more of those messages may no longer be accessible when requested. In such a scenario, the provided quote may have gaps or be empty. An error message may be presented instead of some or all of the quoted message. By contrast, in some situations the messages are available to the quoted message even if the original messages were removed. For example, using a permalink reference can allow for the messages of the quote to be available for display in the quoted message.

Figure 5:
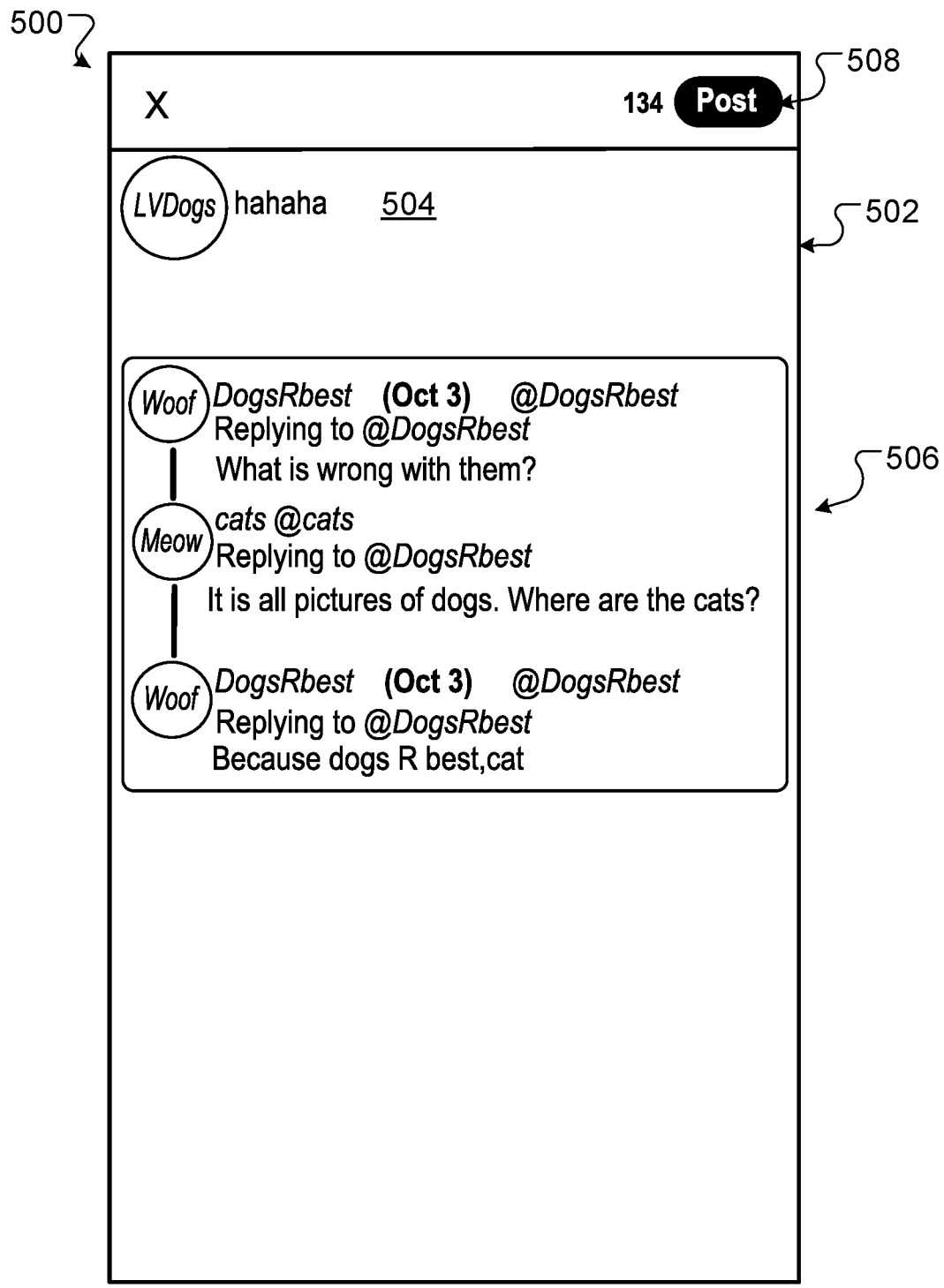
FIG. 5 is a screenshot illustrating an example message composition user interface including a representation of multiple selected messages.

FIG. 5 is a screenshot illustrating an example message composition user interface 500 including a representation of multiple selected messages. The message composition user interface 500 includes a message composition region 502 that includes a first portion 504 for user inputted content, e.g., text, and a second portion 506 displaying the representation of the quoted messages. The representation includes three separate messages selected by the user, e.g., using the selection elements shown in FIG. 4, shown as a block of content in the message composition user interface 500. After adding any additional content in the first portion 504, the user can post the message, e.g., by selecting user interface element 508.

In some implementations, the composed message is structured to provide a container or frame for defining a region of the message to contain the selected messages as part of a quote. Within this structure, each selected message can be stored as a reference to the corresponding message, for example, as a message identifier or a location address, e.g., a URL. For example, the message structure can include an array for storing quoted messages and an order for their presentation. Thus, the composed message can be stored in a message repository of the platform, e.g., message repository 108, in a way that defines the structure of the message including the quote and identifies the messages included within the quote.

The platform posts the message including the quote of the selected messages (212). For example, the message can be added to respective message streams of accounts that follow the account of the authoring user. When a user associated with one of those accounts accesses the social media platform they can be presented with a stream of messages presented in user interface, for example, a timeline of messages presented in reverse chronological order from when they were posted to the social messaging platform.

When providing a message stream to a user account, the message including the quote is rendered by populating the container with the reference messages. For example, message identifiers can be used to retrieve the corresponding quoted messages from the message repository and insert them into the message. In another example, address locations can be used to render the message on a client device side by calling to those locations and inserting the corresponding quoted messages.

Figure 6:
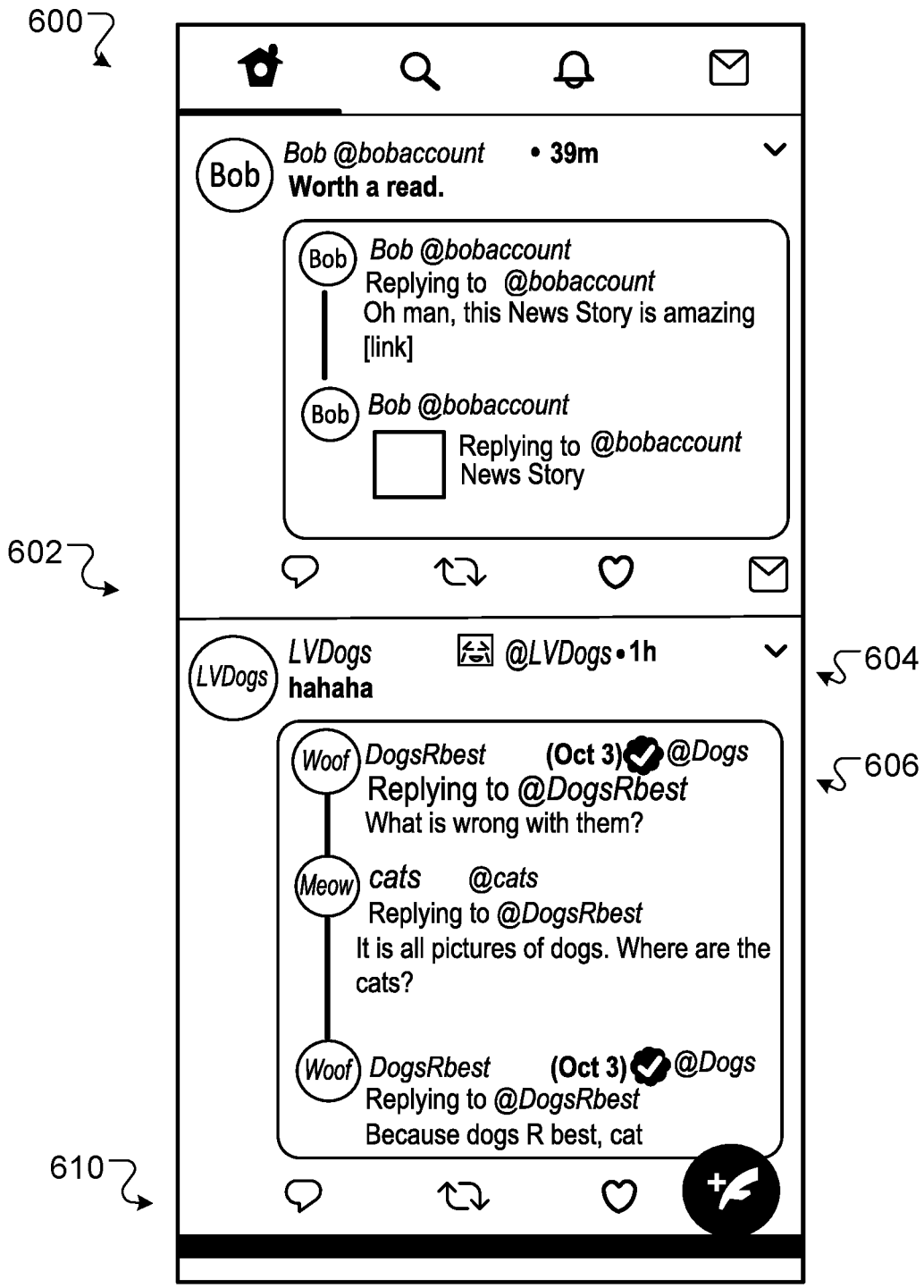
FIG. 6 is a screenshot illustrating an example user interface including a message stream including the posted message.

FIG. 6 is a screenshot illustrating an example user interface 600 including a message stream including the posted message. The user interface 600 presents a portion of a user account message timeline 602 displaying, for example, recently received messages from accounts followed by the user account. The message timeline 602 includes message 604, which includes quoted messages 606. Thus, the quoted messages are presented in a group beneath message text 608. The message 604 includes engagement elements 610, which allows the user to engage with the message itself, e.g., to reply, repost, or endorse.

The user can interact with the quoted messages either as a whole or individually. For example, the user can select the quoted block of messages as a whole. In response to the selection, the user can be presented with the source conversation from which the quoted messages were selected. For example, the quoted messages can each be associated with an identifier or address, e.g., a URL, that, when selected, causes the social messaging platform to redirect the user interface to content corresponding to the source conversation. Thus, the quotes can be positioned within the context of a larger conversation. The messages of the quote can be visually indicated in the conversation, for example, by highlighting those messages.

In some implementations, the user can interact and engage with the individual messages from the quoted messages. Instead of being an image of the respective messages, the quote is composed of the actual message content, e.g., retrieved using the corresponding message identifiers, and metadata that allows for the messages to be interacted with in the same way as any other message on the timeline. Thus, for example, the user can engage with the message by replying, reposting, or endorsing a particular message from the quote. This engagement can be updated in real time to reflect the current engagement with the message on the social messaging platform. In another example, the user can select a particular individual message from the quoted messages to view conversations associated with that message, e.g., replies to that message. For example, the selected message can be presented along with different reply conversations to the message.

In some implementations, additional types of engagement can be computed. For example, how many times a particular message or group of messages was quoted. In some other implementations, users can search for messages that are included as a quotation. For example, when composing a message including multiple quoted messages, the identification of the quoted messages can be indexed as such. This information can be used to responds to search queries.

Figure 7:
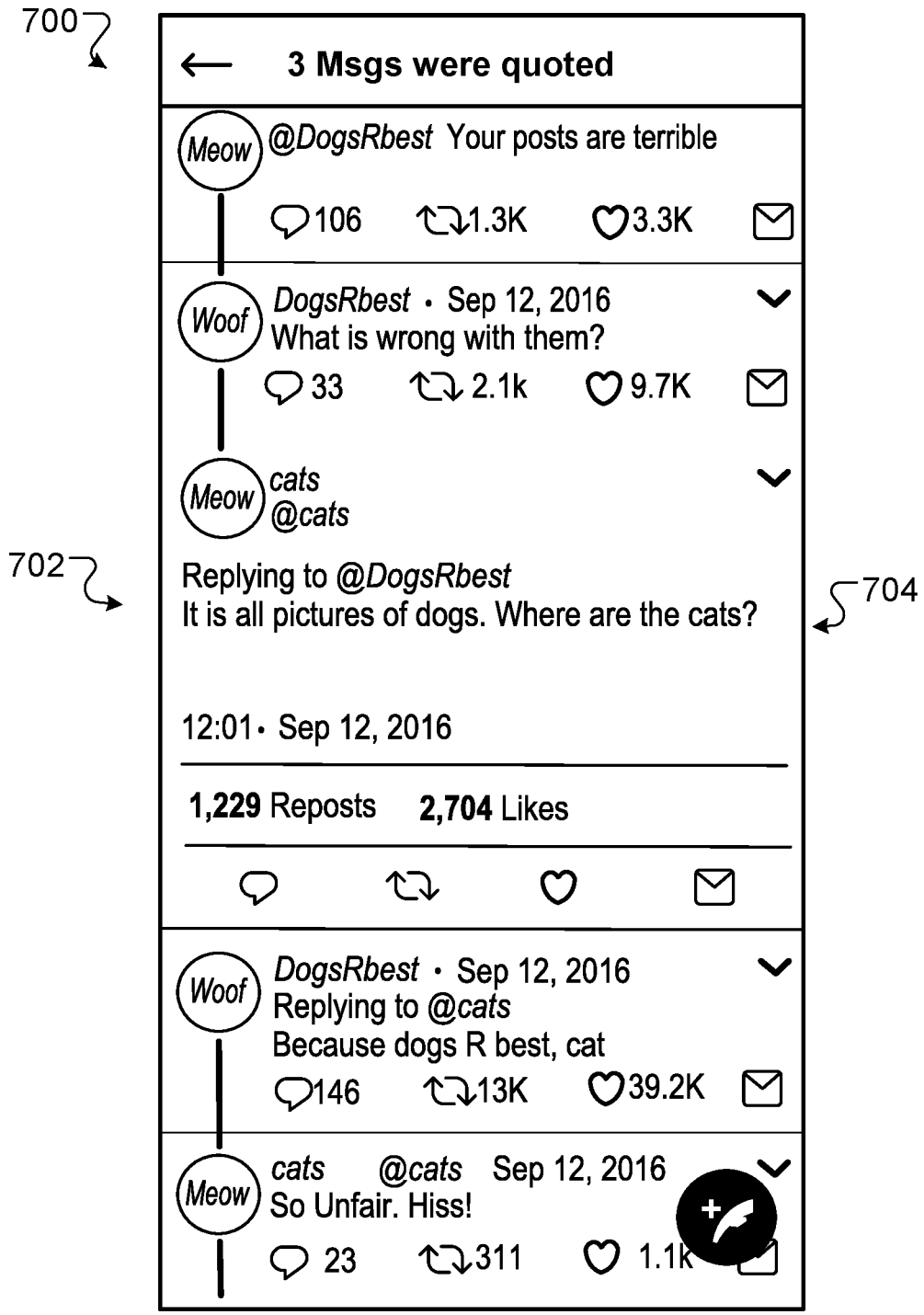
FIG. 7 is a screenshot illustrating an example user interface presented in response to a selection of quoted messages Like reference numbers and designations in the various drawings indicate like elements.

FIG. 7 is a screenshot illustrating an example user interface 700 presented in response to a selection of quoted messages. The user interface 700 includes messages 702 of a conversation from which the quoted messages were selected. The quoted messages 704 are highlighted in the conversation to provide context of their position in the overall conversation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by a social messaging platform, the method comprising:
  providing a plurality of messages of the social messaging platform to a first user device associated with a first user account of the social messaging platform, the plurality of messages comprising messages of at least a portion of a conversation, wherein the conversation on the platform comprises an original message and one or more messages submitted to the platform in reply to the original message;
  receiving, from the first user account, a request to repost, on the platform, multiple messages of the conversation and in response:
    providing, to the first user account, an interface for selecting multiple messages of the conversation to be reposted and, furthermore, an interface for composing a new message, and
    receiving, from the first user account, a selection of one of the multiple messages of the conversation to be reposted and, furthermore, the new message;
  reposting, to a second user account of the platform, the message selected for reposting by the first user account and, furthermore, providing, along with the reposted message, the new message received from the first user account;
  receiving, from the second user account, a selection of the reposted message; and
  providing, to the second user account, the reposted message and another message of the conversation different than the reposted message, the other message provided being, in the conversation, either a message that replied to the reposted message or a message that the reposted message replied to.

2. The method of claim 1, wherein the second user account has a follow relationship with the first user account.

3. The method of claim 1, further comprising:
  receiving, from the second user account, an input of an engagement action with the reposted message in the new message; and
  updating corresponding engagement data for the reposted message.

4. The method of claim 1, wherein the plurality of messages include messages in reply to the original message of the conversation.

5. The method of claim 1, wherein receiving the request to repost comprises providing, to the first user account an interface for selecting a plurality of options including an option to compose a message including multiple selected messages.

6. The method of claim 1, wherein providing the new message comprises:
  using an identifier of the new message to retrieve message content, wherein the message content includes an identifier for the selected one of the multiple messages; and
  using the identifier for the selected one of the multiple messages to retrieve the selected message and render the selected message in the new message presented in a message timeline on a user device.

7. A system comprising:
  a first user device; and
  one or more computers configured to interact with the first user device and to perform operations comprising:
    providing a plurality of messages of a social messaging platform to the first user device associated with a first user account of the social messaging platform, the plurality of messages comprising messages of at least a portion of a conversation, wherein the conversation on the platform comprises an original message and one or more messages submitted to the platform in reply to the original message;

receiving, from the first user account, a request to repost, on the platform, multiple messages of the conversation and in response:

provide, to the first user account, an interface for selecting multiple messages of the conversation to be reposted and, furthermore, an interface for composing a new message, and receiving, from the first user account, a selection of one of the multiple messages of the conversation to be reposted and, furthermore, the new message;

reposting, to a second user account of the platform, the message selected for reposting by the first user account and, furthermore, providing, along with the reposted message, the new message received from the first user account;

receiving, from the second user account, a selection of the reposted message; and providing, to the second user account, the reposted message and another message of the conversation different than the reposted message, the other message provided being, in the conversation, either a message that replied to the reposted message or a message that the reposted message replied to.

8. The system of claim 7,
wherein the second user account has a follow relationship with the first user account.

9. The system of claim 7, wherein the one or more computers are further configured to perform operations comprising:

receiving, from the second user account, an input of an engagement action with the reposted message in the new message; and updating corresponding engagement data for the reposted message.

10. The system of claim 7, wherein the plurality of messages include messages in reply to the original message of the conversation.

11. The system of claim 7, wherein receiving the request to repost comprises providing, to the first user account an interface for selecting a plurality of options including an option to compose a message including multiple selected messages.

12. The system of claim 7, wherein providing the new message comprises:

using an identifier of the new message to retrieve message content, wherein the message content includes an identifier for the selected one of the multiple messages; and using the identifier for the selected one of the multiple messages to retrieve the selected message and render the selected message in the new message presented in a message timeline on a user device.

13. One or more non-transitory computer-readable storage media encoded with instructions that, when executed by one or more computers, cause the one or more computers to perform operations comprising:

providing a plurality of messages of a social messaging platform to a first user device associated with a first user account of the social messaging platform, the plurality of messages comprising messages of at least a portion of a conversation, wherein the conversation on the platform comprises an original message and one or more messages submitted to the platform in reply to the original message;

receiving, from the first user account, a request to repost, on the platform, multiple messages of the conversation and in response:

providing, to the first user account, an interface for selecting multiple messages of the conversation to be reposted and, furthermore, an interface for composing a new message, and receiving, from the first user account, a selection of one of the multiple messages of the conversation to be reposted and, furthermore, the new message;

reposting, to a second user account of the platform, the message selected for reposting by the first user account and, furthermore, providing, along with the reposted message, the new message received from the first user account;

receiving, from the second user account, a selection of the reposted message; and providing, to the second user account, the reposted message and another message of the conversation different than the reposted message, the other message provided being, in the conversation, either a message that replied to the reposted message or a message that the reposted message replied to.

14. The one or more non-transitory computer-readable storage media of claim 13,
wherein the second user account has a follow relationship with the first user account.

15. The one or more non-transitory computer-readable storage media of claim 13, wherein the instructions, when executed by one or more computers, further cause the one or more computers to perform operations comprising:

receiving, from the second user account, an input of an engagement action with the reposted message in the new message; and updating corresponding engagement data for the reposted message.

16. The one or more non-transitory computer-readable storage media of claim 13, wherein the plurality of messages include messages in reply to the original message of the conversation.

17. The one or more non-transitory computer-readable storage media of claim 13, wherein receiving the request to repost comprises providing, to the first user account an interface for selecting a plurality of options including an option to compose a message including multiple selected messages.

18. The one or more non-transitory computer-readable storage media of claim 13, wherein providing the new message comprises:

using an identifier of the new message to retrieve message content, wherein the message content includes an identifier for the selected one of the multiple messages; and using the identifier for the selected one of the multiple messages to retrieve the selected message and render the selected message in the new message presented in a message timeline on a user device.

* * * * *